Patented July 24, 1928.

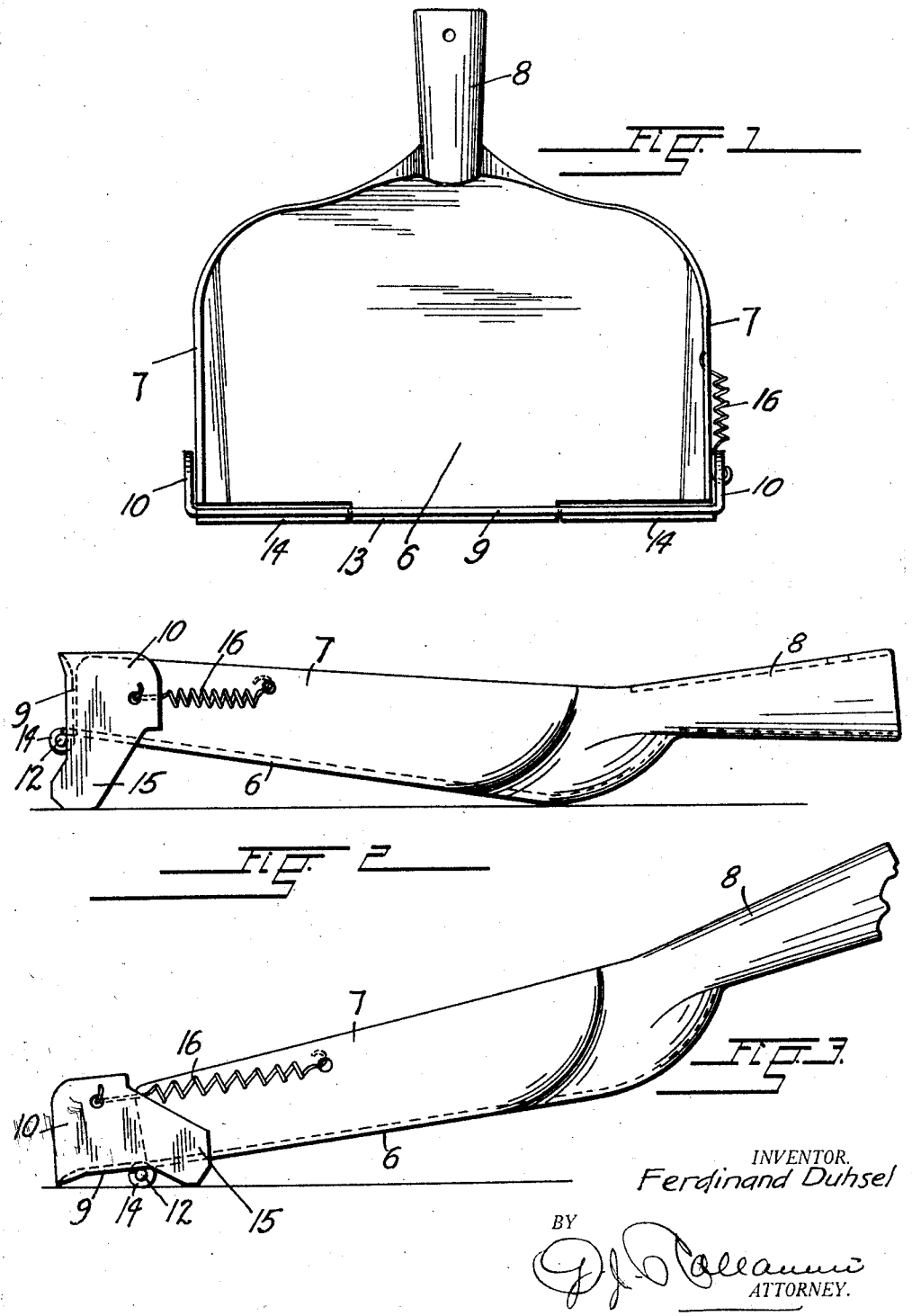

1,678,284

UNITED STATES PATENT OFFICE.

FERDINAND DUHSEL, OF DENVER, COLORADO.

DUSTPAN.

Application filed July 12, 1927. Serial No. 205,218.

My invention relates to dust pans and an object of the invention is to provide in connection with a dust pan of conventional form and construction, a lid which automatically closes the front end thereof when the pan is lifted off the floor or other surface with which it engages to receive the dirt and dust.

A further object of the invention is to provide in a dust pan having a lid for closing the front end thereof, novel means for moving the lid to the open position by contact with the floor or other surface and still another object is to provide in association with a dust pan, a lid which in its open position provides an apron across which the dust and dirt are swept into the pan.

An embodiment of the invention has been illustrated in the accompanying drawings in which like parts are similarly designated throughout the views and in which:

Figure 1 represents a plan view of the improved dust pan,

Figure 2, a side elevation of the same, drawn to an enlarged scale, the lid being shown in its closing position, and Figure 3, a view similar to Figure 2 showing the lid in the open position.

The reference numeral 6 designates the dust pan which may be of any suitable design and form, but which preferably consists of a flat bottom plate having an upturned rim or side 7 along its peripheral edges with the exception of that at the front portion of the pan which is straight and provides an entrance or opening through which the dirt and dust is swept into the pan.

A ferrule 8 at the rear end of the pan provides means for the attachment of a handle.

The opening at the front of the pan is normally closed by a lid 9 provided at its ends with right angularly bent wings 10 to embrace the forward portions of the side of the pan. The lid is hinged at the straight edge of the bottom of the pan by means of a rod or pintle 12 extending through alined knuckles 13 and 14 formed at the edge of the pan and on the thereto contiguous edge of the lid.

The wings 10 of the lid have projections 15 which when the lid is in its closed position as shown in Figure 2, extend downwardly below the bottom of the pan to engage with a surface upon which the pan is placed. The projections are formed to also extend forwardly of the edge of the pan at which the lid is hinged and their forward ends are beveled to facilitate the opening movement of the lid, in which the extensions function.

A coiled spring 16 fastened at its ends to one of the wings of the lid and the corresponding portion of the side or rim of the pan serves to yieldingly hold the lid in its normal closing position.

The extensions 15 are in fact lever arms which cause the lid to move about its axis of articulation when after the pan has been placed upon a floor or other surface as illustrated in Figure 2, it is moved forwardly. It will be noted that the lid in its open position provides an apron across which dirt and dust is swept into the pan and that as soon as the pan is lifted from the floor, the spring automatically returns the lid to its closed position.

It will thus be apparent that the pan may be moved about without danger of its contents spilling through the open end thereof and that the lid requires no manipulation whatsoever but is automatically opened by contact with the floor and automatically closed by the spring.

Having thus described my invention, what I claim and desire to secure by Letters Patent is:—

1. The combination with a dust pan having a bottom and rim portions at opposite ends of the forward edge thereof, of a lid hinged at said edge and adapted to close the space between the rim portions, and a spring holding the lid in its normal closed position, the lid having downwardly ranging projections adapted to open the lid by contact with a surface over which the pan is moved.

2. The combination with a dust pan having a bottom and rim portions at opposite ends of the forward edge thereof, of a lid hinged at said edge and adapted to close the space between the rim portions, and a spring holding the lid in its normal closed position, the lid having downwardly and forwardly ranging projections adapted to open the lid by contact with a surface over which the pan is moved.

3. The combination with a dust pan having a bottom and rim portions at opposite ends of the forward edge thereof, of a lid normally closing the space between the rim portions, and means to impart a forward movement to the lid by contact with a surface over which the pan is moved to a position in which it is alined with the surface of the pan bottom for the passage of dirt across the lid onto the bottom.

4. The combination with a dust pan having a bottom and rim portions at opposite ends of the forward edge thereof, of a lid hinged at said edge and adapted to close the space between the rim portions, the lid having wings embracing the rim portions, and the wings having downwardly ranging projections adapted to open the lid by contact with a surface over which the pan is moved.

In testimony whereof I have affixed my signature.

FERDINAND DUHSEL.